United States Patent [19]
Roth

[11] 4,381,908
[45] May 3, 1983

[54] MOLD APPARATUS FOR FORMING PROFILE EMPLOYING REINFORCING PREFORM

[75] Inventor: Manfred Roth, Dautphetal-Mornshausen, Fed. Rep. of Germany

[73] Assignee: Werkzeugbau Wolfgruben GmbH, Dautphetal, Fed. Rep. of Germany

[21] Appl. No.: 240,708

[22] Filed: Mar. 5, 1981

Related U.S. Application Data

[63] Continuation of Ser. No. 7,211, Jan. 29, 1979, abandoned, which is a continuation of Ser. No. 810,267, Jun. 27, 1977, abandoned.

[30] Foreign Application Priority Data

Jun. 25, 1976 [DE] Fed. Rep. of Germany ....... 2628703

[51] Int. Cl.³ ............................................. B29D 27/00
[52] U.S. Cl. .................................. 425/129 R; 249/91; 264/46.4; 264/46.7; 264/275; 264/278; 264/DIG. 83; 425/817 R
[58] Field of Search .................... 425/129 R, 817 R; 264/46.4, 46.7, 275, 278, DIG. 83; 249/91

[56] References Cited
U.S. PATENT DOCUMENTS

| 742,549 | 10/1903 | Zeh et al. ................................. 52/731 |
| 2,252,090 | 8/1941 | Morin et al. ....................... 264/278 X |
| 2,838,100 | 6/1958 | Follows ........................... 264/46.7 X |
| 3,090,999 | 5/1963 | Karns ................................... 264/275 |
| 3,258,511 | 6/1966 | McGregor, Jr. ................. 264/46.7 X |
| 3,364,292 | 1/1968 | Lemelson ............................ 264/275 |
| 3,366,995 | 2/1968 | Dijken et al. ....................... 249/91 X |
| 3,810,620 | 5/1974 | Decker et al. .................. 264/46.7 X |
| 4,113,905 | 9/1978 | Kessler ............................. 52/790 X |

FOREIGN PATENT DOCUMENTS

| 2358637 | 5/1975 | Fed. Rep. of Germany ..... 264/46.7 |
| 492728 | 7/1919 | France ................................. 52/738 |
| 47-48897 | 12/1972 | Japan ................................. 264/46.7 |
| 47-48898 | 12/1972 | Japan ................................. 264/46.7 |
| 1361385 | 7/1974 | United Kingdom ............... 264/46.7 |

Primary Examiner—Philip E. Anderson
Attorney, Agent, or Firm—Flynn, Thiel, Boutell & Tanis

[57] ABSTRACT

A form box for manufacturing a form, which form box is adapted to hold a reinforcing preform in position during the period of time that an expanding foam mass is injected into the area between the reinforcing preform and the form box. Pins are secured to the form box and project inwardly into the form cavity in which is located the reinforcing preform. The free ends of the pins engage the reinforcing preform to hold same in a fixed position during the period of time that the expanding foam mass is injected into the cavity between the reinforcing preform and the form box.

5 Claims, 6 Drawing Figures

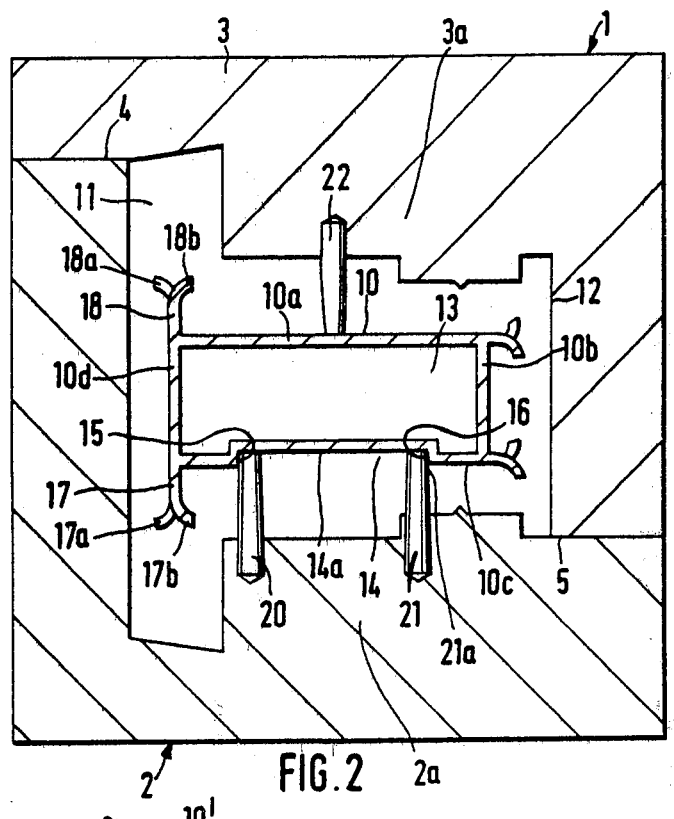
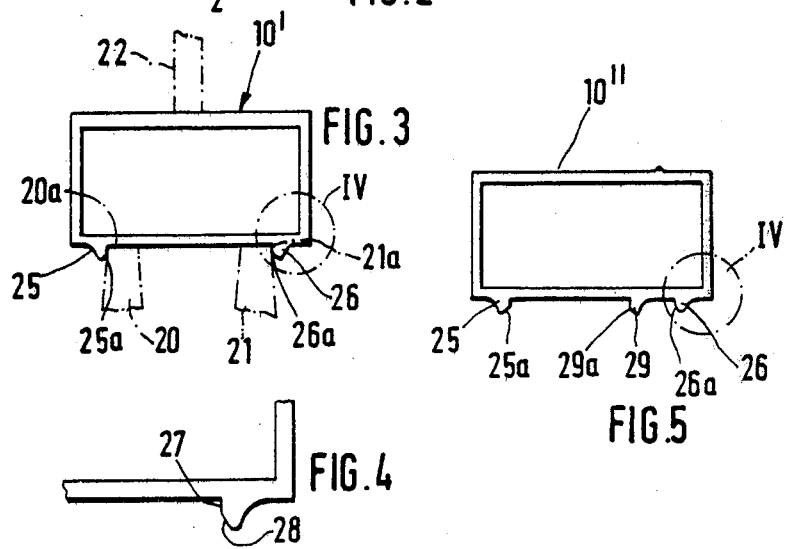

MOLD APPARATUS FOR FORMING PROFILE EMPLOYING REINFORCING PREFORM

This is a continuation of application Ser. No. 7,211 filed Jan. 29, 1979, now abandoned, which is a continuation of application Ser. No. 810,267, filed June 27, 1977, now abandoned.

FIELD OF THE INVENTION

The present invention relates to an elongated form box or mold which has at least two parts which can be released from one another and which are separated by longitudinal joints and in which mounting means for the reinforcing preform are arranged.

BACKGROUND OF THE INVENTION

The manufacture of polyurethane profiles in pregiven usable lengths as they are needed for the articles, for example windows, which are to be manufactured individually, is known.

The manufacture of profiles with pregiven usable lengths and which contain a perforated steel pipe so that the polyurethane mass which surrounds the steel pipe fills out also the inside of the pipe is known. The steel pipe lies back on the two front sides of the profile. The profiles are connected at the ends, which ends have a beveled construction, by means of metal corner angles which are pressed with a large force into preformed recesses within the plastic.

In addition, the manufacture of profiles with pregiven usable lengths is known, the core of which consists of wood or an aluminum profile and the outside of which consists also of a polyurethane mass. Both reinforcing profiles spring back at the ends. The corner connection is done by threading a screw into a nut which is cast into the counter profile or by the corner angle connections.

In addition, it is known to produce a window in one piece. For this a separate form is needed for each window size and frame type and still not all areas of dimension can be included. The manufacture is very expensive, the system has little capability for adjustment.

The manufacture of individual usable lengths of profiles in contrast to long profiles, which can be separated as needed and can then be connected, is proven to be of a great disadvantage. Because of the many window sizes the manufacture of individual usable lengths means a great number of different profile lengths, which results in a large expense in the preparation for manufacture, to carry same out and to deliver the product. Up to now it was not possible to manufacture profiles of the abovementioned type in large lengths.

The basic purpose of the present invention is to develop a profile and a mold for forming the profile by coating a preform with plastic. Thus the purpose consists in the development of long plastic profiles, in particular window profiles, made preferably of polyurethane and having an integrated reinforcing preform which permit through severing at any desired location a variable window design with a high quality corner connection.

The invention includes the provision of a mold in which the reinforcing preforms are precisely aligned on the form wall with lengths of approximately 5,000–6,000 mm.

Problems can arise in the manufacture of profiles in forms or molds without taking any special measures especially in situations where the profiles have a greater length than approximately the provided usable length, because in the case of longer profiles the reinforcing preform does not extend exactly straight between its support points at the form ends but is, instead, bent more or less in a vertical and/or a horizontal plane. In particular, the weight of the reinforcing preform causes a downward sag. In the case of the existing manufacture of common usable lengths, deviations from the straight form were not annoying in each case because these deviations were not excessively great due to the relatively small distance between the end supports and due to a precise positioning in the end areas. As a result, the connection of the profiles to, for example, window frames by means of corner angles did not bring with it any special difficulties.

If, however, longer profile rods are manufactured, which by a cutting of suitable pieces to a usable length, it is necessary that the reinforcing preforms have over their entire length exactly the same position relative to the outer shape of the profile. Only then will the correct alignment of the reinforcing preform with respect to the outer shape exist. This alignment is a condition for a good corner connection by means of corner angles. Also one would risk, by a fixing of a very long reinforcing preform only at its ends such great deviations from the correct position, that the spacing of the reinforcing preform walls from the outer wall of the profile becomes too small and it may even happen that the reinforcing preform becomes visible. However, in the situation of small shiftings of the reinforcing preform considerable disadvantages will occur, like streak formations and color differences on the plastic surface and an influence on the heat insulation characteristic.

The inventive form of the abovementioned type is characterized by arranging pins which are rigidly connected to the form box or mold between the ends of the form box at at least one point (fixing point), preferably at several fixing points and engage the reinforcing preform and hold same over its entire length at an even distance from the inside walls of the form box.

Such a form permits also to fix exactly very long reinforcing preforms relative to the inside wall of the form, so that it is assured that at each later cutting or severing location, the reinforcing preform lies exactly correctly relative to the outer wall of the form. Thus it is possible to manufacture the profiles in lengths of approximately 5,000 to 6,000 mm. Experience has shown, that an arrangement of fixing points at intervals of approximately 800 mm. is sufficient.

If the pins are moved not before the plastic is hardened, holes will remain in the profile and are formed from the pins. It is therefore of an advantage to permit the pins to project from such walls of the form box and form surfaces on the profile, which surfaces will not be visible after installation.

Various pin arrangements are possible. Particularly important are pins provided for the purpose of supporting the reinforcing preform against a downward sag. The preform can, however, also experience a considerable hydrostatic lift or pressure through an expanding foam mass which would effect an upward bending. Action can be taken against this with an arrangement wherein an upper set of pins engage and maintain the upper surface of the preform fixed relative to the lower part of the form box. A pin arrangement wherein the upper pin is equidistantly spaced from a pair of laterally spaced lower pins brings about in the simplest manner a securing of the preform against lateral tilting or warping.

Particular advantages are obtained if according to a further development of the invention the reinforcing preform receives a special construction. In particular the fitting edges are of an advantage, because they cause for example the pins to engage only the bottom of the reinforcing preform while at the same time effecting a lateral fixing of the same. The arrangement of more than two fitting edges (i.e. shoulders) has the advantage that the same reinforcing preforms can be used for different profile forms, because a lateral fixing with the aid of the fitting edges makes it possible for different preform to be fixed in position by fixing pins arranged at such points on the form which do not form later visible sides of the profile.

BRIEF DESCRIPTION OF THE DRAWINGS

Exemplary embodiments of the invention are illustrated in the drawings, in which:

FIG. 2 is a cross-sectional view taken along the line II—II of FIG. 1 or a scale which is enlarged with respect to FIG. 1;

FIG. 3 is a cross-sectional view of a reinforcing preform according to a different embodiment of the invention;

FIG. 4 is an enlarged section of the area in FIG. 3 that is encircled by the dash-dotted circle IV;

FIG. 5 is a modification of the reinforcing preform; and

DETAILED DESCRIPTION

Figure 1:
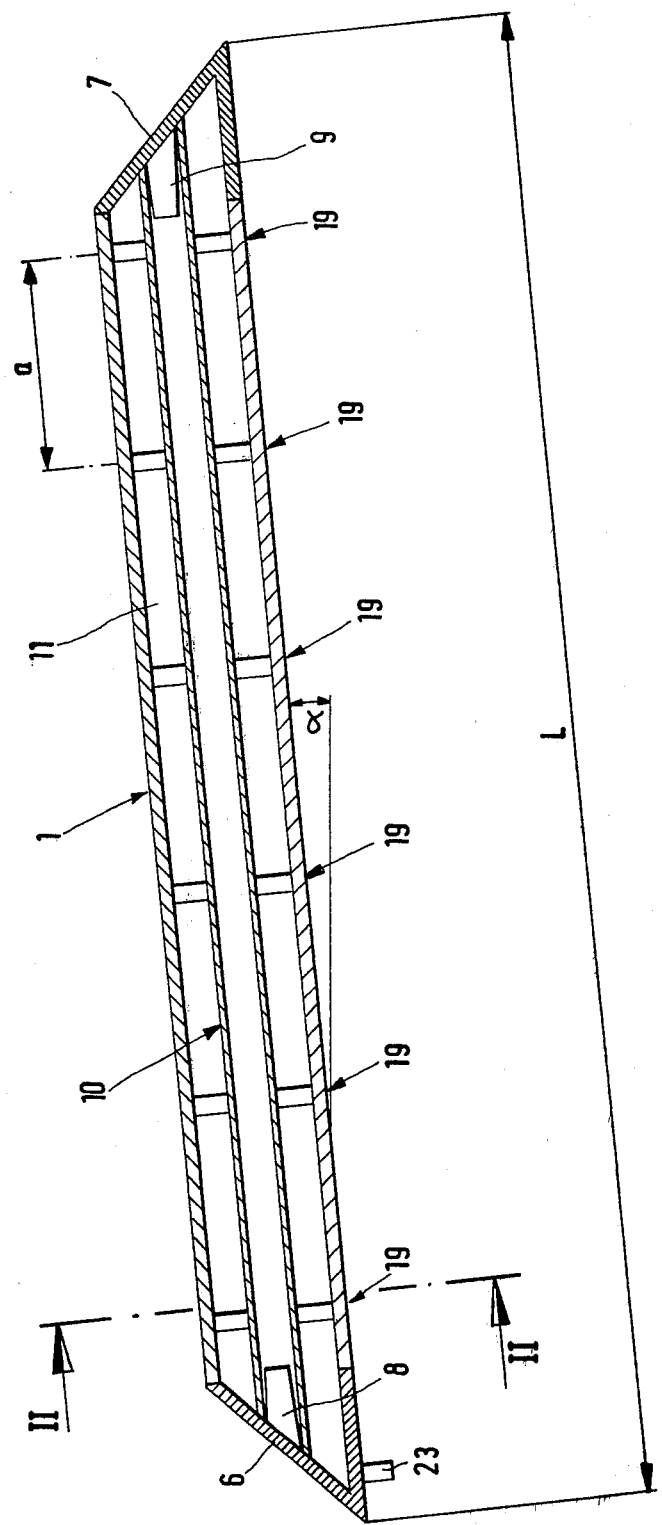
FIG. 1 is a longitudinal cross-sectional view of an inventive form or mold.

FIG. 1 illustrates a form or mold which as a whole is identified by the reference numeral 1 and is shown in its natural position, as it is chosen for forms, which are foamed with plastic, namely the form extends slightly inclined wherein the angle of slope $\alpha$, for example, is in the range of approximately 6° to 15°. The form is substantially an elongated box or mold, the cross section of which is enlarged in FIG. 2. The form box or mold 1 has a lower part which as a whole is identified by the reference numeral 2 and an upper part which as a whole is identified by the reference numeral 3. The upper part 3 can be released from engagement with the lower part 2 along joints 4 and 5 which extend along the length of the entire form. End walls 6 and 7 are mounted on the ends of the form box 1. Tongues 8 and 9 project from the end walls 6 and 7, respectively, to which tongues a reinforcing preform 10 can be fixed at its ends.

The form box or mold has a cavity 11, the walls 12 of which form the sidewalls of a profile. A mold for the manufacture of a window profile is illustrated.

The reinforcing preform 10 which is illustrated in FIG. 2 is box-shaped in construction. The preform 10 has a cavity 13, which is defined by walls 10a to 10d. The walls 10a, 10b and 10d are planar in construction, while the wall 10c has a notch 14 therein defined laterally by fitting edges or shoulders 15 and 16. The wall 10d has extensions 17 and 18 which project outwardly beyond the walls 10a and 10c, the edges of which extensions have notches therein. The tabs 17a, 17b and 18a, 18b are alternately bent out from the plane of the wall extensions 17,18 and form anchorage projections.

So-called fixing points are inventively arranged along the form or mold at several points, which fixing points have been identified in FIG. 1 together by the reference numeral 19. The fixing points are distributed evenly over the length of the form and are spaced from one another at a distance "a", which can be for example 800 mm. The distance "a" depends also on the respective form or mold of the reinforcing profile which is to be fixed. In the case of a particularly unstable reinforcing preform, the distance "a" must be smaller than is necessary in the case of a particularly stiff preform. The fixing points are constructed in the illustrated embodiment in the manner as is shown in FIG. 2.

Pins 20 and 21 are provided at each fixing point in the bottom 2a of the form box part 2, which pins 20 and 21 are spaced from one another in a direction transversely to the longitudinal direction of the form box or mold. A further fixing pin 22 is provided in the bottom 3a of the upper form box part 3, which fixing pin 22 lies between the pins 20 and 21. The pins 20,21 are conically constructed adjacent their upper end 20a or 21a (FIG. 3) and are tapered upwardly. The upper fixing pin 22 is also tapered. Each fixing pin has an approximately planar or flat end surface.

In the illustrated embodiment, the fixing pins are pressed into blind holes in the form wall or are secured by a thread.

During the manufacture of a profile, the reinforcing preform 10 is inserted into the form box 1 when the upper form box part 3a is still lifted off and the tongues 8,9 are moved into the cavity 13. The conical ends 20a,21a of the fixing pins 20,21 will rest with their conical side surfaces against the fitting edges or shoulders 15,16. The base 14a of the recess 14 rests on the top surfaces of the fixing pins 20,21. When the upper form box part 3a is mounted on top of the form box part 2, the lower surface on the upper fixing pin 22 presses on the wall 10a and thus causes a fixed engagement of the fixing pins 20,21 with the base 14a of the recess 41. Because of the engagement with the edges 15,16, the pins 20,21 are also able to fix the reinforcing preform 10 against displacement toward the side relative to the form box. As a result, it is assured that the outer walls of the reinforcing preform have over the entire length thereof the same spacing from the inner walls 12 of the form box. Due to the conically-shaped end zones 20a,21a of the lower fixing pins it is also possible to achieve precise lateral fit (seat). The upper part of the form 3 is precisely fixed relative to the lower part of the form 2. The form is then held in the closing position by not shown means. The plastic foam mass is filled in thereafter through the feedhead 23 (FIG. 1), namely substantially at the lowermost point of the form 1, through which due to a subsequent reaction and expansion, the form cavity 11 is filled in. A hydrostatic lift or a change of the position of the reinforcing preform 10 in the form part, for example, cannot take place because this is prevented by the fixing pins.

After hardening of the plastic, the form is opened and the fixing pins 20,21 and 22 are simultaneously pulled out of the plastic. Openings remain then in the plastic. This, however, is not of any disadvantage because the openings are at locations on the finished profile which are not visible in the position of use thereof.

If the operation takes place when the plastic is still flowable, the pins can still be pulled back and are pulled back when the plastic has hardened such that a shifting of the reinforcing preform 10 must no longer be feared; however, the plastic still has the capability of filling in the recesses left by the pins.

In a preferred modification of manufacture, an adhesive is applied to the outside of the reinforcing preform 10, the composition of which depends on the material of the reinforcing preform and of the plastic material and has the characteristic of producing a good connection between the reinforcing preform and the plastic. Alternatively and additionally, the anchorage projections 17a,17b and 18a,18b and possible further anchorage projections which are not shown assure that a shifting between the plastic and the reinforcing preform 10 does not take place.

During processing of the profiles which are manufactured in large lengths (the length L of the form 1 being for example 6,000 mm.), suitable pieces are manufactured by severing the length into several sections and the angle of severing is done as a rule at an angle of 45°. The reinforcing preform 10 is also severed.

FIG. 3 shows a reinforcing preform 10' which has two riblike elevations 25 and 26, the inner sides of which form fitting edges 25a and 26a. As one can see from the enlarged section in FIG. 4, each fitting edge has surfaces 27 and 28 and the sloped surface 28 presents an introducing slope, while the surface 27 is the actual fixing surface or shoulder.

The fixing pins 20,21 and 22 are indicated by dash-dotted lines in FIG. 3. Both the introducing slopes 28 and also the conical ends 20a,21a of the lower fixing pins ease the engagement of the fixing pins with the fitting edges 27.

FIG. 5 illustrates a further modification 10'' in which additionally to the ribs 25 and 26 a rib 29 is provided. The ribs 26 and 29 are identically oriented, namely their fitting edges 26a and 29a both face to the left. The additional fitting edge 29a according to FIG. 5 makes it possible to laterally fix the reinforcing preform selectively between the fitting edges 25a and 29a or between the fitting edges 25a and 26a. The distance between the ribs 29 and 26 must be at least sufficient that the engaging end of the fixing pin 21 fits between the ribs 26 and 29. The selective fixing possibility has the advantage that the same reinforcing preform can be used for the manufacture of different profiles and the possibility of selections for the place of engagement of the fixing pins opens up the possibility of avoiding later visible surfaces on the profile which was in engagement with the fixing pins.

Figure 6:
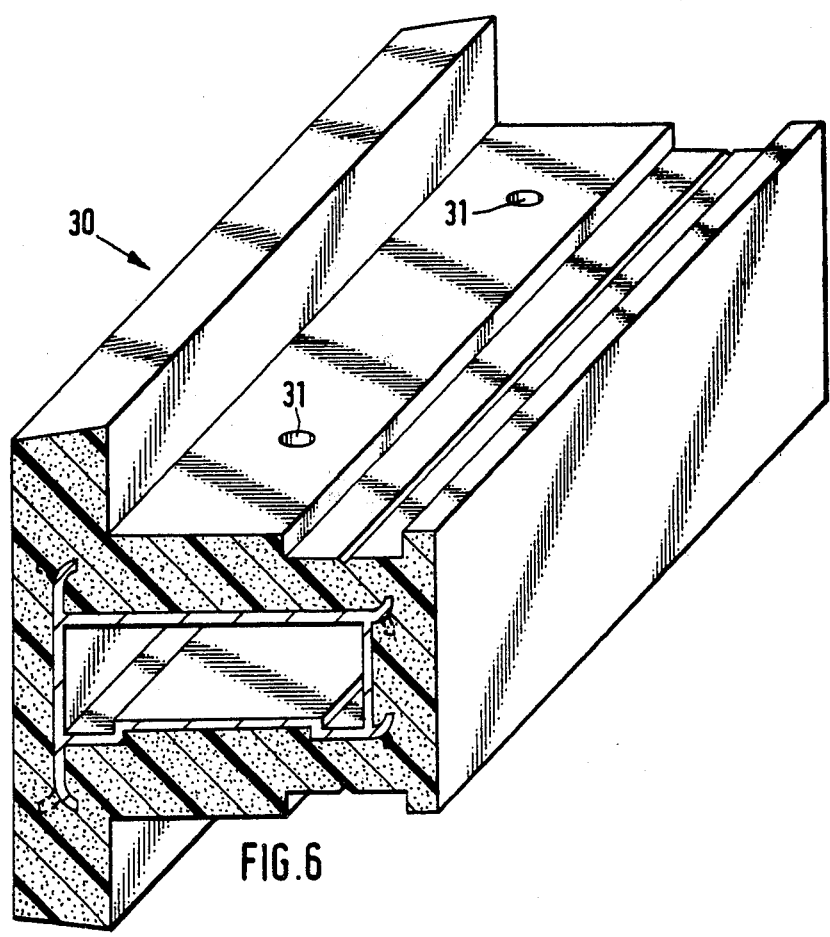
FIG. 6 is a perspective illustration of a profile.

The looks of a profile can be taken entirely from FIG. 2, for which reason a separate profile drawing would actually not be necessary. Nevertheless FIG. 6 illustrates perspectively a profile piece. The profile is identified as a whole by the reference numeral 30 and has the cross-sectional shape which is visible from FIG. 2, which shape is defined by the cross section of the form. Holes 31 are visible on the finished profile. However, FIG. 6 shows only the holes which are formed by the upper fixing pins 22, while the holes which are formed by the lower fixing pins 20,21 cannot be seen.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A horizontally elongated mold having horizontally elongated upper and lower mold parts with a parting plane therebetween for permitting vertical separation between the parts, said parts having cooperating wall means which, when the parts are closed, define a profiled mold cavity which is elongated in the elongated direction of the mold, said wall means including upper and lower walls on said upper and lower parts respectively, a plurality of preform support means mounted on said mold parts at selected fixing points along said elongated direction and projecting into said mold cavity for permitting an elongated reinforcing preform to be fixedly supported within said cavity in spaced relationship to said wall means, said preform support means including first and second pin means fixed to said lower part and projecting substantially vertically upwardly from said bottom wall into said mold cavity, said first and second pin means being laterally spaced apart and defining thereon upper surfaces adapted to supportingly engage a lower surface on the preform, said first and second pin means also defining a pair of oppositely directed side surfaces adapted to respectively engage opposed oppositely directed side shoulders on the preform for preventing transverse movement of the preform relative to the mold, said preform support means also including third pin means fixed to said upper part and projecting substantially vertically downwardly from said upper wall into said mold cavity, said third pin means having a lower surface adapted to supportingly engage an upper surface on the preform for vertically confining the preform between said first, second and third pin means.

2. A mold according to claim 1, wherein said third pin means, relative to the horizontal lateral direction, is positioned between said first and second pin means.

3. A mold according to claim 2, wherein said third pin means is positioned approximately midway between said first and second pin means relative to said horizontal lateral direction.

4. A mold according to any one of claims 1-3, wherein said first, second and third pin means as associated with each said support means are disposed substantially within a single transverse plane which is parallel to the separation direction between the upper and lower mold parts.

5. A mold according to claim 1, wherein the first, second and third pin means have portions thereof which are disposed within the mold cavity, which said portions are of a converging conical configuration as they project toward the free ends thereof.

* * * * *